(12) United States Patent
Al-Mufti

(10) Patent No.: US 12,413,651 B2
(45) Date of Patent: Sep. 9, 2025

(54) SYSTEM AND METHOD FOR COMMUNICATING BETWEEN A RADIO AND A VIRTUAL BASEBAND UNIT WHICH ARE INCOMPATIBLE

(71) Applicant: Outdoor Wireless Networks LLC, Richardson, TX (US)

(72) Inventor: Khalid W. Al-Mufti, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/416,563

(22) Filed: Jan. 18, 2024

(65) Prior Publication Data

US 2024/0163352 A1 May 16, 2024

Related U.S. Application Data

(63) Continuation of application No. 17/060,505, filed on Oct. 1, 2020, now Pat. No. 11,917,039.

(60) Provisional application No. 63/072,578, filed on Aug. 31, 2020, provisional application No. 62/916,072, filed on Oct. 16, 2019.

(51) Int. Cl.
*H04L 69/08* (2022.01)
*H04L 69/321* (2022.01)

(52) U.S. Cl.
CPC ............ *H04L 69/08* (2013.01); *H04L 69/321* (2013.01)

(58) Field of Classification Search
CPC ...................................................... H04L 69/08
See application file for complete search history.

(56) References Cited

U.S. PATENT DOCUMENTS

| | | | |
|---|---|---|---|
| 10,278,081 B2 | 4/2019 | Cotanis | |
| 2005/0002417 A1* | 1/2005 | Kelly | H04L 69/08 370/466 |
| 2005/0128918 A1 | 6/2005 | Park et al. | |
| 2012/0214477 A1* | 8/2012 | Wieslawa | H04W 4/18 455/507 |
| 2017/0078158 A1 | 3/2017 | Dec et al. | |
| 2017/0373890 A1* | 12/2017 | Fertonani | H04L 27/2634 |
| 2018/0091385 A1 | 3/2018 | Haag et al. | |
| 2020/0366542 A1* | 11/2020 | Barbieri | H04B 1/1661 |
| 2021/0120104 A1 | 4/2021 | Al-Mufti | |

(Continued)

FOREIGN PATENT DOCUMENTS

| | | |
|---|---|---|
| JP | 2013093658 A | 5/2013 |
| JP | 2016538759 A | 12/2016 |
| JP | 2018523403 A | 8/2018 |

(Continued)

OTHER PUBLICATIONS

Korean Intellectual Property Office, "Notification Rejection" dated Oct. 2, 2024, from KR Application No. 10-2022-7014688, from Foreign Counterpart to U.S. Appl. Nos. 17/060,505 16/536,963, pp. 1 through 21, Published: KR.

(Continued)

*Primary Examiner* — Glenton B Burgess
*Assistant Examiner* — Patrick F Ngankam
(74) *Attorney, Agent, or Firm* — Fogg & Powers LLC

(57) ABSTRACT

Techniques are provided for transforming, using at least one translation library, data communicated between a radio and a virtual baseband unit having incompatible data protocols.

20 Claims, 3 Drawing Sheets

(56) References Cited

U.S. PATENT DOCUMENTS

2022/0110017 A1* 4/2022 Medeiros .......... H04W 28/0284
2022/0123854 A1* 4/2022 Cederholm .......... H04L 1/0009

FOREIGN PATENT DOCUMENTS

| WO | 2010059083 A1 | 5/2010 | |
|---|---|---|---|
| WO | 2016048430 A1 | 3/2016 | |
| WO | 2016145371 A3 | 9/2016 | |
| WO | WO-2016145371 A2 * | 9/2016 | .......... H04B 1/1661 |
| WO | 2018178230 A1 | 10/2018 | |

OTHER PUBLICATIONS

Japanese Patent Office, "Notice of Allowance" dated Dec. 13, 2024, from JP Application No. JP-2022-522880, from Foreign Counterpart to U.S. Appl. No. 17/060,505, pp. 1 through 4, Published: JP.
NTT DOCOMO, Inc., "eCPRI and the Study on CU-DU lower layer split for NR", 3GPP TSG-RAN WG3 #97bis, R3-174089, Prague, Czech Republic, Oct. 9-13, 2017, pp. 1 through 6.
Japanese Patent Office, "Notice of Reason for Rejection", dated Jul. 23, 2024 from JP Application No. 2022-522880, from Foreign Counterpart to U.S. Appl. No. 17/060,505, pp. 1 through 5, Published: JP.
China National Intellectual Property Administration, "Notification of the First Office Action", from CN Application No. 202080072527. 9, Jun. 27, 2023, from Foreign Counterpart to U.S. Appl. No. 17/060,505, pp. 1 through 24, Published: CN.
European Patent Office, "Extended European Search Report", from EP Application No. 20877867.0, from Foreign Counterpart to U.S. Appl. No. 17/060,505, Jul. 28, 2023, pp. 1 through 9, Published: EP.
IEEE, "IEEE Standard for Radio over Ethernet Encapsulations and Mappings", IEEE Standards Association, IEEE-SA Standards Board, Sep. 27, 2018, pp. 1 through 77, Mobile Communications Networks Standards Committee of the IEEE Communications Society.
International Bureau, "International Preliminary Report on Patentability", from PCT Application No. PCT/US2020/053708, from Foreign Counterpart to U.S. Appl. No. 17/060,505, Apr. 28, 2022, pp. 1 through 11, Published: WO.
International Searching Authority, "International Search Report and Written Opinion from PCT Application No. PCT/US2020/053708", from Foreign Counterpart to U.S. Appl. No. 17/060,505, Jan. 15, 2021, pp. 1 through 9, Published: WO.
O-RAN, "O-RAN Alliance Working Group 4 Management Plane Specification", ORAN-WG4.MP.0-v02.00.00 Technical Specification, 2019, pp. 1 through 149, O-RAN Alliance.
O-RAN, "O-Ran Fronthaul Working Group Control, User and Synchronization Plane Specification", ORAN-WG4. CUS.0-v02.00 Technical Specification, 2019, pp. 1 through 218, O-RAN Alliance.
U.S. Patent and Trademark Office, "Final Office Action", U.S. Appl. No. 17/060,505, Nov. 3, 2022, pp. 1 through 25, Published: US.
U.S. Patent and Trademark Office, "Notice of Allowance", U.S. Appl. No. 17/060,505, Oct. 18, 2023, pp. 1 through 20, Published: US.
U.S. Patent and Trademark Office, "Notice of Panel Decision from Pre-Appeal Brief Review", U.S. Appl. No. 17/060,505, Jan. 10, 2023, pp. 1 through 2, Published: US.
U.S. Patent and Trademark Office, "Office Action", U.S. Appl. No. 17/060,505, May 17, 2022, pp. 1 through 27, Published: US.
U.S. Patent and Trademark Office, "Office Action", U.S. Appl. No. 17/060,505, Jun. 15, 2023, pp. 1 through 25, Published: US.

* cited by examiner

SYSTEM AND METHOD FOR COMMUNICATING BETWEEN A RADIO AND A VIRTUAL BASEBAND UNIT WHICH ARE INCOMPATIBLE

CROSS-REFERENCE TO RELATED APPLICATIONS

The present application is a continuation of U.S. patent application Ser. No. 17/060,505 filed on Oct. 1, 2020, which claims benefit of U.S. Patent Application Ser. Nos. 62/916,072 (filed Oct. 16, 2019) and 63/072,578 (filed Aug. 31, 2020); the entire contents of the aforementioned patent applications are incorporated herein by reference as if set forth in their entirety.

BACKGROUND

Wireless communications service providers are deploying 5G radio access networks (RANs). Such 5G radio access networks are configured to satisfy the open radio access network (O-RAN) Alliance specifications ("0-RAN specifications"). The O-RAN specifications include without limitation the O-RAN fronthaul working group control, user and synchronization plane specification (ORAN-WG4.CUS.0-V04.00) and O-RAN Alliance working group 4 management plane specification (ORAN-WG4.MP.0-v04.00.00); the O-RAN specifications are hereby incorporated by reference herein in their entirety.

The O-RAN specifications permit interoperability of RAN components, e.g., O-RAN specification compliant radios (or O-RAN radio units or O-RAN radios) and an O-RAN specification compliant distributed units (or O-RAN distributed units), made by different vendors. The O-RAN distributed unit may be executed on a server system, e.g., local server network(s) and/or cloud computing system(s). The O-RAN distributed unit (O-DU) may comprise virtual baseband unit(s)). The O-RAN specifications utilize message protocols to communicate between remote radio units and virtual baseband units that differ from those used in legacy systems, e.g., 4G specification compliant radio access networks (or 4G radio access networks). A virtual baseband unit processes, e.g., encodes, baseband data received from and sent to radio(s). A radio transmits and/or receives data at one or more frequencies translated above baseband. The virtual baseband unit and radio(s) are components of a communications system such as a cellular communications system.

There is a substantial amount of existing 4G specification compliant radios (or 4G radios), e.g., 4G specification compliant remote radio units, which will be replaced with 5G specification compliant radios (or 5G radios), e.g., 5G specification compliant remote radio units, over time, or possibly may never be replaced. Wireless communications service providers desire to upgrade portions of existing 4G radio access networks, e.g., virtual baseband units, so that they will work with both legacy 4G and 5G radios. Legacy 4G radios utilize a common public radio interface (CPRI) input/output (I/O) data protocol (defined by a CPRI specification) which is incompatible with an evolved common public radio interface (eCPRI) input/output data protocol used by, e.g., O-RAN specification compliant 5G radios. Although new 4G radios are being developed which conform with O-RAN specification, it is not cost effective to replace legacy 4G radios.

SUMMARY

A method of facilitating communications between a radio and a virtual baseband unit is provided. The method comprises: at least one of: determining characteristics of the radio and receiving characteristics of the radio using a first input/output (I/O) data protocol and a first message protocol; selecting at least one translation library corresponding to the at least one of determined characteristics and the received characteristics; generating configuration parameters that describe capabilities of the radio, and transmit such configuration parameters to the virtual baseband unit using a second I/O data protocol and a second message protocol, wherein the first I/O data protocol and the second I/O data protocol are incompatible; converting at least one of: (a) baseband data, in an uplink path, in at least one of a user plane, a control plane, a synchronization plane, and a management plane into the second I/O data protocol used by the virtual baseband unit, and (b) baseband data, in a downlink path, in the second I/O data protocol into data in at least one of the user plane, the control plane, the synchronization plane, and the management plane; and converting using the selected at least one translation library at least one of: a message in the first message protocol, transmitted from the radio to the virtual baseband unit, to the second message protocol, and a message in the second message protocol transmitted from the virtual baseband unit to the radio, to the first message protocol, wherein the first message protocol and the second message protocol are incompatible.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
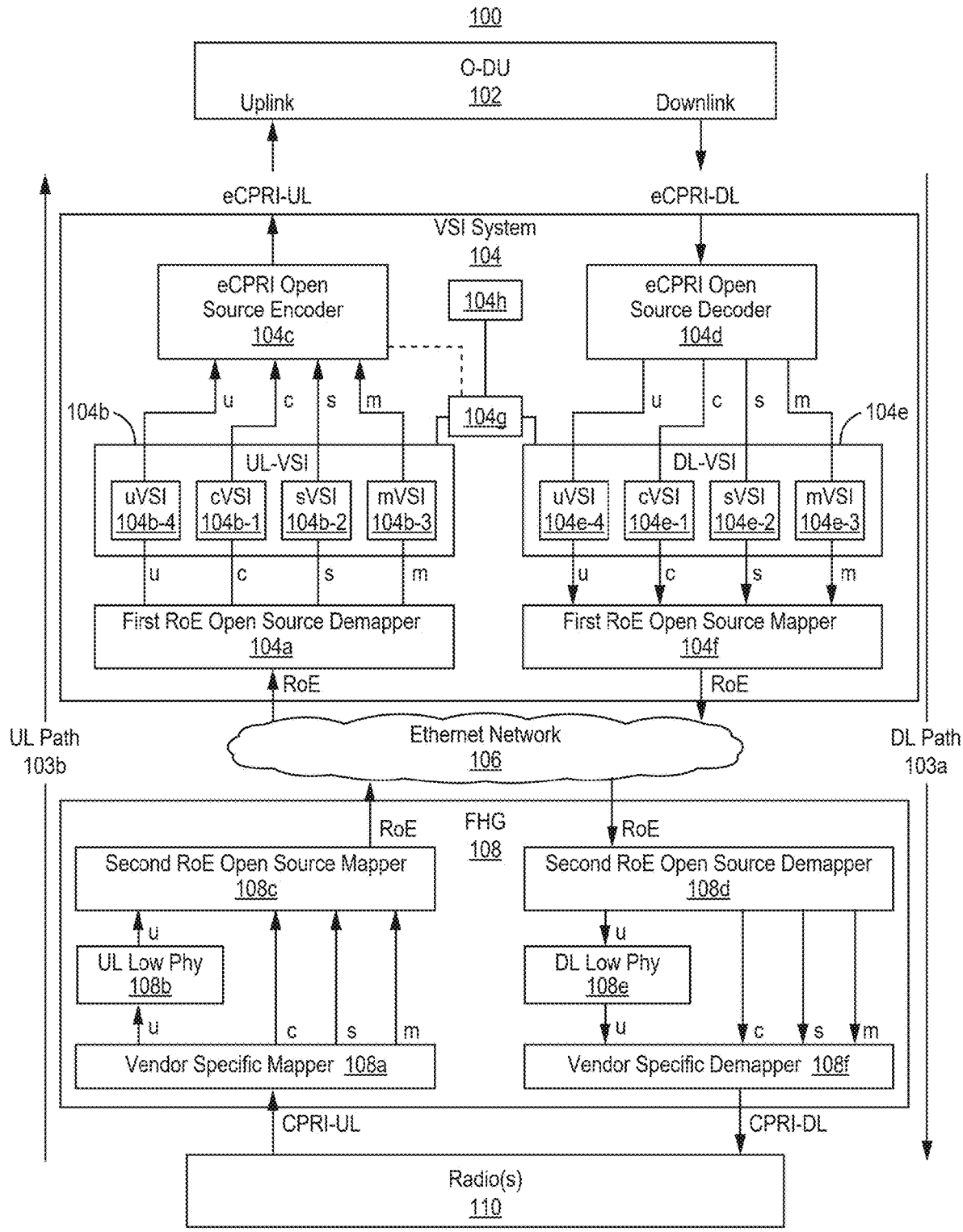
FIG. 1 illustrates a block diagram of one embodiment of a radio access network utilizing a modified fronthaul gateway and a vendor specific interpreter system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

The embodiments of the present invention provide methods and systems are provided for facilitating communications between a radio and a virtual baseband unit, where an I/O data protocol of the radio is incompatible with the I/O data protocol of the virtual baseband unit and/or a message protocol of the radio is incompatible with a message protocol of the virtual baseband unit. The I/O data protocol is a protocol used to convey messages in a user plane, a control plane, a synchronization plane, and/or a management plane. Each radio and each virtual baseband unit have a I/O data protocol. CPRI and eCPRI are examples of an I/O data protocol. Radio as used herein describes a remote radio unit, remote radio head, radio antenna unit, or a similar radio system.

Each message protocol has a format, i.e., a syntax with one or more variables. A message sent by a radio in the user plane, the control plane, the synchronization plane, or the management plane is in a message protocol that may vary based upon one or more characteristics of the radio. The I/O data protocol of a radio may vary based upon one or more characteristics of the radio, e.g., compliance with a specification (for example an input/output data protocol of the radio). Radio characteristics include specification(s) with which the radio complies, radio manufacturer, radio model number, and/or radio software version. A message sent by a virtual baseband unit has characteristics based upon characteristics of the virtual baseband unit. The I/O data protocol of a virtual baseband unit may vary based upon one or more characteristics of the virtual baseband unit, e.g., compliance with a specification (for example an input/output data protocol of the virtual baseband unit). Virtual baseband unit characteristics include specification(s) with which the virtual baseband unit complies, virtual baseband unit manufacturer, virtual baseband unit model number, and/or virtual baseband unit software version, Optionally, the virtual baseband unit is an O-DU. For pedagogical purposes, an O-DU is illustrated herein. However, embodiments of the invention are applicable to other types of virtual base band units. A virtual baseband unit means a baseband unit configured to be executed on server(s) and/or in a Cloud computing system, and to be communicatively coupled to at least one radio.

Optionally, the radio may be a legacy radio whose specifications predate the specifications of the virtual baseband unit. For example, the radio may be a CPRI specification compliant 4G radio and the virtual baseband unit may be an eCPRI specification compliant O-RAN distributed unit (e.g. used in a 5G radio access network). Thus, for example: data provided by a CPRI specification compliant 4G radio will appear at an eCPRI specification compliant and O-RAN specification compliant distributed unit as if it originated from an eCPRI specification compliant and an O-RAN specification compliant radio; data provided by the eCPRI specification compliant and the O-RAN specification compliant distributed unit will appear to the CPRI specification compliant 4G radio as if it originated from a CPRI specification compliant and 4G specification compliant virtual baseband unit. The embodiments of the invention may apply to other I/O data protocols and different specifications defining a message protocol.

Embodiments of the invention are applicable to communications systems where one or both of the I/O data protocol and message protocol are incompatible between radio(s) and a virtual baseband unit. Further, in addition to 'incompatible radio(s), one or more 'compatible' radios, e.g., eCPRI specification compliant O-RAN specification compliant radio unit(s) (O-RU(s)), may also be coupled to the virtual baseband unit, e.g., an O-DU. Such compatible radio(s) would not require the functionality of the subsequently illustrated vendor specific demapper and mapper, uplink and downlink vendor specific interpreters, and eCPRI open source encoder and decoder. Such compatible radio(s) would be conventionally communicatively coupled to the virtual baseband unit.

Incompatible means that (a) the I/O data protocol of a radio is different from the I/O data protocol of the virtual baseband unit so that the virtual baseband unit cannot comprehend and/or process the I/O data of the radio and vice versa, and/or (b) the message protocol of the radio is different from the message protocol of the virtual baseband unit so that the virtual baseband unit cannot comprehend and/or process messages from the radio, and vice versa. As a result, the radio and the virtual baseband unit cannot communicate, and thus interoperate, amongst themselves. For example, the radio is a legacy radio using a message protocol and I/O data protocol that predates the message protocol and I/O data protocol of the virtual baseband unit, and where the I/O data protocols and message protocols of the radio and virtual baseband unit are incompatible. To communicate amongst themselves, data transmitted from one (the radio or the virtual baseband unit) must have its I/O data protocol and/or message protocol converted, or translated, into an I/O data protocol and/or a message protocol comprehensible by the other (respectively the virtual baseband unit or the radio).

For pedagogical purposes, the radio illustrated herein is a 4G radio and the virtual baseband unit illustrated herein is an O-DU. However, in other embodiments of the invention, the radio and/or the virtual baseband unit can be compliant with other communications standards and use other I/O data protocols (e.g., other than CPRI and/or eCPRI).

Thus, the subsequently described radio access network is illustrated, for pedagogical purposes, as having 5G compliant RAN components, e.g., a modified fronthaul gateway and an O-DU. However, other embodiments of the invention may utilize RAN components conforming to standards other than those exemplified herein.

Certain networks are illustrated as Internet protocol (IP) packet networks, e.g., Ethernet networks. However, other types of data networks may be used. Thus, the term "data network" may be used to describe a data network including but not limited to an IP packet network such as an Ethernet network. The terms data network mapper and data network demapper may be used to refer to data network mappers and data network demappers including but not limited to Radio over Ethernet (RoE) mappers and RoE demappers. The terms baseband data encoder and baseband data decoder may be used to refer to respectively a data encoder and a data decoder including but not limited to respectively an eCPRI encoder and an eCPRI decoder. Vendor as used herein may include but is not limited to manufacturer. RoE mappers, RoE demappers, eCPRI encoder, and eCPRI decoder are illustrated herein for pedagogical purposes.

In the 5G radio access network designed according to the O-RAN specifications, a 5G base station (or gNB) includes an O-DU coupled to O-RU(s) through a fronthaul gateway (FHG) compliant with the O-RAN specifications. The fronthaul gateway is located proximate to radio(s) to which it is coupled, e.g., at the base of mounting structure (a pole, a tower, a roof, or other structure) on which the radio(s) are mounted.

The O-DU is configured to host radio link control (RLC), medium access control, and physical (PHY) layers. Optionally, the O-DU is configured to host higher layer protocols, e.g., radio resource control, service data adaption protocol (SDAP), and packet data convergence protocol (PDCP); optionally, these services can be implemented in a central unit (CU). The O-DU is further configured to provide frequency domain baseband data, e.g., having in-phase and quadrature phase (I and Q) components. Thus, the O-DU has some functionality similar to 2G, 3G and/or 4G virtual baseband unit(s).

A data interface of the O-DU (or O-DU interface) is configured to be coupled to either the central unit or a core network. The central unit is configured to be coupled between the O-RAN distributed unit and the core network. Optionally, the O-RAN distributed unit and/or the central unit are configured to be implemented in software executed on a first server (or first server circuitry) or first cloud computing system (or first cloud computing system circuitry). Uplink and downlink data communicated through the O-DU interface comprises data in a user plane (U), a control plane (C), a synchronization plane (S), and/or a management plane (M). User plane data comprises voice and/or data transmitted to and from user equipment coupled to radio(s) of the RAN. Control plane data comprises messages used to control how a corresponding radio (receiving the control plane data) processes user plane In-phase and Quadrature-phase data stream in the uplink and downlink paths in real time. Synchronization plane data comprises data for synchronization and timing information between nodes (e.g., between a virtual baseband unit and a radio or between a modified fronthaul gateway and either a virtual baseband unit or a radio) of a RAN. Management plane data comprises data for operation, administration, and maintenance of radio(s), where such operation, administration, and maintenance is not required in real time. The control, synchronization, and/or management planes are bidirectional. Thus, a ping or a query sent in a one of the control, synchronization, and/or management plane in the downlink path may result in acknowledgement and/or responsive data the same plane in the uplink path.

The fronthaul gateway is configured to perform some physical (PHY) layer signal processing on the baseband data previously performed in the baseband unit(s) of radio access networks compliant with 4G or earlier specifications. Such signal processing includes performing a discrete Fourier transforms and discrete inverse Fourier transforms respectively on baseband data in the uplink and downlink paths of the RAN and/or weighting of certain baseband data in the uplink path and/or the downlink path.

Optionally, the O-DU and the fronthaul gateway are coupled by a network, e.g., an Ethernet network. The O-DU is configured to transmit and receive baseband data, respectively to and from the fronthaul gateway, in an eCPRI data protocol which is compliant with the O-RAN specifications. Optionally, when such a network is used and it is a RoE type Ethernet network, the fronthaul gateway is configured to transmit and receive baseband data, respectively to and from the O-DU, in RoE type Ethernet format which is compliant with IEEE standard 1914.3-2018 which is incorporated herein by reference in its entirety.

FIG. 1 illustrates a block diagram of one embodiment of a radio access network 100 utilizing a modified fronthaul gateway 108 and a vendor specific interpreter system 104. Each of the components comprising the vendor specific interpreter (VSI) system 104 and the modified fronthaul gateway 108 may be implemented in software, e.g., as one or more software modules. The modified fronthaul gateway 108 may be alternatively referred to as modified fronthaul gateway circuitry. The vendor specific interpreter system 104 may alternatively be referred to herein as vendor specific interpreter circuitry.

The radio access network 100 has an uplink (UL) path 103b used to communicate data from user equipment (e.g., smart phones, tablets, and laptop computers) to the core network, and a downlink (DL) path 103a used to transmit data from the core network to user equipment. Because the core network is communicatively coupled to the O-DU 102, data from user equipment is transmitted to the O-DU 102 in the uplink path. Further, data from the O-DU 102 is transmitted to user equipment in the downlink path. The downlink path 103a includes subsequently described eCPRI-DL path (eCPRI-DL) and eCPRI-DL path (eCPRI-DL). The uplink path 103b includes subsequently described eCPRI-UL path (eCPRI-UL) and CPRI-UL path (CPRI-UL).

The user equipment is communicatively coupled through the radio access network 100 through the core network to one or more other networks, e.g., the Internet. Embodiments of the invention may be employed in cellular base stations and/or a digital distributed antenna systems (digital DASs). For example, one or more universal access points (UAPs; also known as remote antenna units or remote units) of a digital DAS may be coupled to a modified fronthaul gateway 108 in lieu of a cellular remote radio, such as a 4G radio. For purposes of clarity, the radio(s) (or at least one radio) 110 illustrated in FIG. 1 may comprise one or more UAPs and/or one or more cellular remote radios.

The radio access network 100 comprises an O-DU 102, the vendor specific interpreter system (VSI system) 104, the modified fronthaul gateway (FHG) 108, and at least radio (or radio(s)) 110 having an I/O data protocol incompatible with an I/O data protocol of the O-DU 102. The O-DU 102 is configured to be communicatively coupled to the core network, e.g., optionally through a central unit. The O-DU 102 is configured to be communicatively coupled to one or more modified fronthaul gateways. However, for pedagogical purposes, FIG. 1 illustrates one modified fronthaul gateway 108. Each modified fronthaul gateway 108 is configured to be communicatively coupled to at least one radio 110 having an I/O data protocol incompatible with an I/O data protocol of the O-DU 102. The at least one radio 110 having an I/O data protocol incompatible with an I/O data protocol of the O-DU 102 may be referred to as the least one radio.

Each modified fronthaul gateway 108 is configured to communicatively couple the at least one radio 110 to the VSI system 104. For pedagogical reasons, a port of the at least one radio 110 will be illustrated herein, e.g., in FIG. 1, as a CPRI port having a CPRI uplink path (CPRI-UL) and a CPRI downlink path (CPRI-DL). A single port can be coupled to only one radio, or, e.g., using daisy chaining, to more than one radio.

The O-DU 102 is configured to transmit and receive data respectively to and from the VSI system 104 in a data format, e.g., optionally an e-CPRI data format. The radio(s) 110 are configured to transmit and receive data respectively to and from the modified fronthaul gateway 108 in a data format, e.g., optionally a CPRI data format. The VSI system 104 is configured to be coupled to the modified fronthaul gateway 108. The modified fronthaul gateway 108 and a vendor specific interpreter system 104 permit radio(s) 110, e.g., 4G radio(s), to interoperate with virtual baseband unit, e.g., an O-DU 102. The O-DU 102 comprises at least one port, where each port is an eCPRI port comprising an eCPRI uplink path (eCPRI-UL) and eCPRI downlink path (eCPRI-DL).

The VSI system 104 is configured to:
(a) at least one of determine characteristics of the radio and receive characteristics of the radio. The characteristics of the radio may include radio manufacturer, radio model number, and/or radio software version;

(b) select at least one translation library corresponding to the at least one of determined characteristics and the received characteristics;

(c) generate configuration parameters that describe capabilities of the radio, and transmit such configuration parameters to the virtual baseband unit;

(d) convert at least one of: (i) baseband data, in an uplink path, in at least one of a user plane, a control plane, a synchronization plane, and a management plane into an input/output (I/O) data protocol used by the virtual baseband unit, and (ii) baseband data, in a downlink path, in the I/O data protocol used by the virtual baseband unit into data in at least one of the user plane, the control plane, the synchronization plane, and the management plane; and (e) convert using the selected at least one translation library at least one of: (i) a message in a message protocol of the radio, transmitted from the radio to the virtual baseband unit, to a message protocol of the virtual baseband unit, and (ii) a message in a message protocol of the virtual baseband unit, transmitted from the virtual baseband unit to the radio, to a message protocol of the radio.

The illustrated embodiment of the VSI system 104 comprises an eCPRI open source encoder 104c, an eCPRI open source decoder 104d, an uplink vendor specific interpreter (UL VSI) 104b, and a downlink vendor specific interpreter (DL VSI) 104e. However, the VSI system 104 may be implemented in different ways. The operation of the VSI system 104 is illustrated for pedagogical reasons with respect to the VSI system 104 illustrated in FIG. 1.

Optionally, the eCPRI open source encoder 104c is configured to perform (d)(i) above. Optionally, the eCPRI open source decoder 104d is configured to perform (d)(ii) above. Optionally, the UL VSI 104b is configured to perform (e)(i). Optionally, the DL VSI 104e is configured to perform (e)(ii) above.

Optionally, the VSI system 104, and any of its constituent components, is configured to be executed by the first server system (or first server system circuitry), and/or the first cloud computing system—which also executes the O-DU 102. Optionally, the VSI system 104 is configured to be executed by a second server system (or second server system circuitry) and/or a second cloud computing system (or second cloud computing system circuitry); the second server system and/or the second cloud computing system are communicatively coupled to the first server system, and/or the first cloud computing system. Optionally, the second server system and/or the second cloud computing system are communicatively coupled to the first server system, and/or the first cloud computing system, e.g., by IP data network(s).

The eCPRI open source encoder 104c is configured to perform (d)(i) above. Thus, the eCPRI open source encoder 104c is configured to receive data in the control plane, the synchronization plane, the management plane, and/or the user plane, in the uplink path 103b and previously converted by and received at input(s) from corresponding output(s) of the UL VSI 104b, and convert such data into the eCPRI data protocol. The eCPRI open source encoder 104c is further configured to transmit the data converted into the eCPRI data protocol to the O-DU 102. Thus, the eCPRI open source encoder 104c transmits baseband data in the uplink path to the O-DU 102 in the eCPRI data protocol, when the data originated in another format, e.g., the CPRI data format, from a radio. The eCPRI open source encoder 104c converts the user plane, control plane, synchronization plane, and management plane data in to corresponding eCPRI packets. User, control, synchronization, and management plane inputs of the eCPRI open source encoder 104c are respectively coupled to user, control, synchronization, and management plane outputs of the UL VSI 104b. An output of the eCPRI open source encoder 104c is configured to be coupled to an uplink input of the OD-U 102.

The eCPRI open source decoder 104d is configured to perform (d)(ii) above. The eCPRI open source decoder 104d extracts different types of payload data from the eCPRI packets and sends, in corresponding planes, the data for each type of payload data to the DL VSI 104e. The different data types correspond to the user plane, the control plane, the synchronization plane, and the management plane data. Thus, the eCPRI open source decoder 104d is configured to receive data in the eCPRI data protocol from the O-DU 102 in the downlink path 103a, extract data in the user plane, the control plane, the synchronization plane, and the management plane (based upon the O-RAN standard) from the received data in the eCPRI data protocol, and to transmit the data in the user plane, the control plane, the synchronization plane, and the management plane from output(s) to corresponding input(s) of the DL VSI 104e. An input of the eCPRI open source decoder 104d is configured to be coupled to a downlink output of the O-DU 102. User, control, synchronization, and management plane outputs of the eCPRI open source decoder 104d are configured to be coupled respectively to user, control, synchronization, and management plane inputs of the DL VSI 104e.

The UL VSI 104b is configured to receive the data in the user plane, and the control plane, the synchronization plane, and the management plane from the modified fronthaul gateway 108. The UL VSI 104b is further configured to convert the message(s) in the user plane, the control plane, the synchronization plane, and/or the management plane from a protocol of a radio to a protocol which conforms to the O-RAN specification. The user plane, the control plane, the synchronization plane, and the management plane input(s) of the UL VSI 104b are configured to be coupled to corresponding uplink output(s) of the modified fronthaul gateway 108 (e.g., respectively the user plane output of the uplink low physical layer system (UL Low PHY) 108b, and the control plane, the synchronization plane, and the management plane outputs of the vendor specific mapper 108a).

The DL VSI 104e is configured to receive message(s) in the user plane, the control plane, the synchronization plane, and the management plane in an O-RAN specification protocol, and to convert such received message(s) to message(s) in a protocol of the radio (of the radio(s) 110) to which the message(s) are directed. The DL VSI 104e is further configured to transmit such converted data to the modified fronthaul gateway 108, e.g., through the optional Ethernet network 106. User, control, synchronization, and management plane outputs of the DL VSI 104e are configured to be coupled to corresponding downlink input(s) of the modified fronthaul gateway 108 (e.g., respectively the user plane output of the downlink low physical layer system (DL Low PHY) 108e, and the control, synchronization, and management plane outputs of the vendor specific demapper 108O. Optionally, as discussed below, the VSI system 104 further comprises a first RoE open source demapper 104a and a first RoE open source mapper 104f.

Determination of radio characteristics may be performed automatically and/or manually. Radio characteristics may be known, e.g., because the corresponding radio must have been previously acquired, installed, and/or its software updated. Such data may exist in an external processing system, e.g., optionally in a database which may be communicatively coupled to the VSI system 104, e.g., through the Internet. Additionally or alternatively, a person or system may manually configure the VSI system 104, e.g., a database, to store the characteristics of the radio.

Optionally, the VSI system 104 includes a radio characterization system 104g which is configured to determine the vendor of a radio to facilitate the conversions of the VSI system 104 specified in (e) above. However, this functionality may be implemented in one or more other components of the VSI system 104. The radio characterization system 104g (or any component(s) incorporating its functionality) is communicatively coupled to the UL-VSI 104b and the DL-VSI 104e, and optionally to the eCPRI open source encoder 104c.

The radio characterization system 104g is configured to automatically determine characteristics of each radio of the radio(s) 110. This can be done automatically by analyzing data in one or all of the planes from the radio(s) 110. For example, the radio characterization system 104g can cause the VSI 104, e.g., the DL VSI 104e, to send one or more messages (having a protocol corresponding to specific radio characteristics) in one or more of the user plane, control plane, synchronization plane, and management plane to a radio of the radio(s) 110 to elicit responsive message (in a protocol expected by the DL VSI 104e) from the radio. If the VSI 104, e.g., the UL VSI 104b, receives desired responsive data (e.g., a message) rather than no response or an undesired response (e.g., data indicating that the data received by the radio was unintelligible), then prior to sending a message in another format, the VSI 104, e.g., the radio characterization system 104g can identify characteristics of such radio. Optionally, the responsive message can further identify characteristic(s) of such radio of the radio(s) 110.

Optionally, upon automatically determining one of the radio characteristics of such radio, at least one translation library is selected. One translation library may be selected to be used by both the UL VSI 104b and the DLVSI 104e, or a separate translation library may be selected for each of the UL VSI 104b and the DLVSI 104e. The at least one translation library may be part of the VSI system 104 (and one or more components therein) or located elsewhere, e.g., remotely. A set of translation libraries from which the at least one translation library is selected may be saved in the VSI system 104 and/or external of the VSI 104. FIG. 1 illustrates that the at least one translation library 104h is in the VSI 104. The at least one translation library translates the protocol of messages in the UL path data in the user plane, the control plane, the synchronization plane, and/or the management plane from a message protocol used by a radio to a message protocol used by the OD-U 102. The at least one translation library 104h translates the protocol of messages in the DL path in the user plane, the control plane, the synchronization plane, and the management plane from a message protocol used by the O-DU 102 to a format used by the radio. A translated message is functionally equivalent to the message translated so that it conveys the same information but in a different protocol. The at least one translation library 104h may be at least one database, at least one neural network, and/or other system(s) for facilitating translation.

The databases or other system(s) can be programed using vendor provided list of definitions that identifies the purpose and function of each data field(s) within each of the data planes. This information can be in the form of an Interface Control Document (ICD), which comprehensively defines protocols of messages configured to be received and/or transmitted in the user plane, the control plane, the synchronization plane, and/or the management plane by a radio. The ICD may further contain functional information, value ranges, and description of how the data in each plane is used to facilitate control, synchronization, and management of the radio through the control plane, the synchronization plane, and the management plane. The neural network(s) can be trained with messages configured to be received and/or transmitted in the user plane, the control plane, the synchronization plane, and/or the management plane by a radio, and with corresponding messages configured to be transmitted and/or received in the user plane, the control plane, the synchronization plane, and/or the management plane by a the O-DU 102 communicatively coupled to the radio.

Optionally, the modified fronthaul gateway 108 may detect if a radio has been coupled to the modified fronthaul gateway 108. To do so, the vendor specific mapper 108a detects whether Antenna-Carrier (AxC) container(s), e.g., Antenna-Carrier container(s) without data, are being emitted from an unknown radio. Each radio comprises or is associated with one or more antennas; each antenna of a radio has a unique Antenna-Carrier container. If the vendor specific demapper 108f detects such Antenna-Carrier container(s) from an unknown radio, it will communicate (e.g., through the management plane) the existence of the unknown radio to the VSI system 104, e.g., to the UL-VSI 104b, which can initiate automatic determination of radio characteristics of such unknown radio. Optionally, modified fronthaul gateway 108 need not detect if a radio has been coupled to the modified fronthaul gateway 108 and the VSI system 104 need determine radio characteristics of such a radio, if each radio of the radio(s) 110 automatically sends data to the DL VSI 104e to initiate communications with the O-DU 102. In such a case the UL VSI 104b (and possibly the radio characterization system 104g) would analyze the received message(s) from each radio of the radio(s) 110 with database(s) and/or neural network(s) to determine which librar (ies) correspond to each radio.

The embodiment of the modified fronthaul gateway 108 illustrated in FIG. 1 comprises the vendor specific mapper 108a, the UL Low PHY 108b, the DL Low PHY 108e, and the vender specific demapper 108f. The modified fronthaul gateway 108 may be implemented in other ways. An input of the vendor specific mapper 108a is configured to be coupled to a CPRI Uplink (CPRI-UL) output of the radio(s) 110. User plane, control plane, synchronization plane, and management plane outputs of the vendor specific mapper 108a are coupled respectively to a user plane input of the UL low PHY 108b and configured to be coupled to uplink input(s) of the VSI system 104 (e.g., control, synchronization, and management plane inputs of the UL VSI 104b). An output of the vendor specific demapper 108f is configured to be coupled to a CPRI Downlink (CPRI-DL) input of the radio(s) 110. User plane, control plane, synchronization plane, and management plane inputs of the vendor specific demapper 108f are coupled respectively to a user plane output of the DL Low PHY 108e and downlink output(s) of the VSI system 104 (e.g., control, synchronization, and management plane outputs of the DL VSI 104e). Optionally, the modified fronthaul gateway 108 further comprises a second RoE open source mapper 108c and a second RoE open source demapper 108d.

Optionally, the VSI system 104 is coupled to the modified fronthaul gateway 108 through an Ethernet Network 106. The Ethernet network 106 may comprise at least one Ethernet cable, at least one Ethernet switch, at least one Wi-Fi access point, and/or at least one Ethernet router. When the VSI system 104 is coupled to the modified fronthaul gateway 108 by the Ethernet network 106, the VSI system further comprises a first RoE open source demapper 104a and a first RoE open source mapper 104f, and the modified fronthaul gateway 108 comprises a second RoE open source demapper 108d and a second RoE open source mapper 108c. An input and output of the first RoE open source demapper 104a are respectively coupled to an output of the second RoE open source mapper 108c (through the Ethernet network 106) and user plane, control plane, synchronization plane, and management plane inputs of the UL VSI 104b. Inputs and an output of the first RoE open source mapper 104f are respectively coupled to user plane, control plane, synchronization plane, and management plane outputs of the DL VSI 104e and the input of the second RoE open source demapper 108d (through the Ethernet network 106). Inputs and an output of the second RoE open source mapper 108c are respectively coupled to user plane output of the UL low PHY 108b and the control, synchronization, and management plane outputs of the vendor specific mapper 108a, and the input of the first RoE open source demapper 104a (through the Ethernet network 106). An input and output of the second RoE open source demapper 108d are respectively coupled to an output of the first RoE open source mapper 104f (through the Ethernet network 106) and a user plane input of the DL low PHY 108e, and the control, synchronization, and management plane inputs of the vendor specific demapper 108f.

Alternatively, the VSI system 104 may be directly connected to, otherwise coupled to, or made part of the fronthaul gateway 108. Thus, for example, the VSI system 104 may be deployed with the fronthaul gateway 108, e.g., at a site of a cellular base station. If the VSI system 104 is part of or in close proximity to the fronthaul gateway 108, then RoE open source mappers and RoE open source demappers in the VSI system 104 and the modified fronthaul gateway 108 may not be required. Thus, RoE open source mappers, RoE open source demappers, and the data network between such mappers and demappers are optional in some embodiments of the invention.

The VSI system 104 is configured to transmit and receive data respectively to and from the O-DU 102, e.g., using the eCPRI format and/or another data format. The VSI system 104 and the modified fronthaul gateway 108 are configured to communicate over the Ethernet network 106, e.g., using the RoE type Ethernet format and/or another data format.

The modified fronthaul gateway 108 is located proximate to the radio(s) 110, e.g., at a base of a mounting structure (e.g., a tower or pole) on which the radio(s) 110 are mounted or in or by a master unit of a DAS. The modified fronthaul gateway 108 may be implemented by a processing system (or processing circuitry). The modified fronthaul gateway 108 and the radio(s) 110 are configured to communicate by a communications protocol such as the common public radio interface (CPRI) (which is a time division multiplexed communications protocol) and/or another communications protocol. The modified fronthaul gateway 108 is configured to:

perform at least one of: at least one of discrete Fourier transformation and data weighting on user plane data in the uplink path, and at least one of inverse Fourier transformation and data weighting on user plane data in the downlink path; and at least one of: convert data in at least one of a user plane, a control plane, a synchronization plane, and a management plane in a downlink path to data in an I/O data protocol used by the radio, and convert data in the I/O data protocol used by the radio in an uplink path into data in at least of the user plane, the control plane, the synchronization plane, and the management plane.

The uplink path 103b of the modified fronthaul gateway 108 will first be described. The modified fronthaul gateway 108 in the uplink path 103b comprises a vendor specific mapper 108a, an uplink low physical layer system (UL Low PHY) 108b, and a second RoE open source mapper 108c. The vender specific mapper 108a is configured to receive at least one control word and at least one CPRI AxC container, e.g., from the radio(s) 110, transform received data (in a vendor specific format) in each control word and CPRI AxC container into user, control, synchronization, and/or management plane data, and to transmit the user, control, synchronization, and/or management plane data. Optionally, mapping (or transformation) data comprising the vender specific mapper 108a and/or the vendor specific demapper 108f is provided by vendor(s) of the radio(s) 110. Optionally, such mapping data may be in the form of a look up table and/or a database. The mapping data identifies, for each control word and corresponding CPRI AxC container data corresponding to an antenna from which data originated, a structure of data in the control word and corresponding CPRI AxC container data. Such data includes user, control, synchronization, and management plane data, and an antenna identifier. Optionally, the vendor specific mapper 108a comprises software and/or hardware configured to detect the manufacturer(s) of the radio from which the control word and corresponding CPRI AxC container originates to determine what software and/or hardware should be used to transform the vendor specific control word and container data into user, control, synchronization, and/or management plane data. Optionally, the vender specific mapper 108a may be implemented with software including a look up table, a database, and/or a neural network.

Optionally, the CPRI containers may be Antenna-Carrier containers (or CPRI AxC containers) pursuant to the CPRI standard, of data associated with a unique antenna coupled to one of the radio(s) 110. The CPRI AxC container comprises one or more sets of data, e.g., one I/Q sample, for example of 16 bits. The CPRI AxC container may contain user plane data, and the control word may contain control, synchronization, and/or management plane data. The format of such CPRI data provided in control words and CPRI AxC containers is unique for each vendor of the radio(s) 110, e.g., 4G radios.

The UL Low PHY 108b is configured to receive user plane data, e.g., from the vendor specific mapper 108a, perform processing of at least one of the following types: a discrete Fourier transform and data weighting on the received user plane data, and to transmit the processed user plane data, e.g., to an optional second RoE open source mapper 108c or to an uplink vendor specific interpreter (UL VSI) 104b. Data weighting is used to achieve digital beam forming; the In-phase and the Quadrature-phase data in the user plane is multiplied by complex beam forming weights. The optional second RoE open source mapper 108c is used when an Ethernet network 106 couples the VSI system 104 and the modified fronthaul gateway 108. The optional second RoE open source mapper 108c is configured to receive the processed user plane data, e.g., from the UL Low PHY 108b, and control, synchronization, and management plane data, e.g., from the vendor specific mapper 108a. The second RoE open source mapper 108c is further configured to generate a RoE type Ethernet frame(s) containing processed user, control, synchronization, and management plane data, and to transmit the Ethernet frame to the Ethernet network 106.

The second RoE open source mapper 108c generates the RoE type Ethernet frame as follows. The second RoE open source mapper 108c generates a data payload from the received processed user plane data, and control, synchronization, and management plane data are placed into data payloads. The second RoE open source mapper 108c generates a transport layer segment comprising a transport layer segment header and a data payload. The second RoE open source mapper 108c generates the transport layer segment header which includes source and destination ports and a checksum value. The source and destination ports are endpoints to logical connections. The checksum, e.g., the sum of the payload data bytes, is used at the endpoint to verify that the data payload of the transport layer segment was received without error. The transport layer segment header also includes a sequence number to facilitate a recipient of the transport layer segments to reassemble the data of numerous data payloads in a correct order. The transport layer segment header can be a user datagram protocol (UDP) or transmission control protocol (TCP) header.

The second RoE open source mapper 108c generates an IP datagram by appending an IP header to each transport layer segment. This forms an IP packet. The second RoE open source mapper 108c generates the IP header which includes the source IP address and the destination IP address. IP addresses may correspond to an IP address of the O-DU and/or an Antenna-Carrier container of a radio. The IP header may also include time-to-live data that limits the lifespan of that portion of payload data.

The second RoE open source mapper 108c generates an Ethernet frame of a RoE type by generating and appending an Ethernet header and an Ethernet trailer to the IP packet. The Ethernet header includes the source and destination media access controller addresses. The Ethernet trailer includes a frame check sequence, which is a cyclic redundancy check (CRC) value that is used by the recipient of the Ethernet frame to detect any data corruption within the frame arising during communications of the Ethernet frame.

The modified fronthaul gateway 108 in the downlink path 103a comprises the second RoE open source demapper 108d, a downlink low physical layer system (DL Low PHY) 108e, and a vendor specific demapper 108f. The second RoE open source demapper 108d is configured to receive the Ethernet frames of a RoE type from the Ethernet network 106, and to extract user, control, synchronization, and management plane data from the received Ethernet frames. The second RoE open source demapper 108d is further configured to transmit user plane data to, e.g., the DL Low PHY 108e, and control, synchronization, and management plane data to the vendor specific demapper 108f.

The DL Low PHY 108e is configured to receive user plane data, e.g., from the second RoE open source demapper 108d, perform processing of at least one of the following types: a discrete inverse Fourier transform and data weighting on the received user plane data, and to transmit the processed user plane data, e.g., to the vendor specific mapper 108e. The vender specific demapper 108f is configured to receive processed user plane data, and control, synchronization, and management plane data, transform such processed user plane data, and control, synchronization, and management plane data into control words and CPRI AxC containers, where each control word and CPRI AxC container is in a vendor specific format corresponding to a radio to which the control word and CPRI AxC container is directed. Each CPRI AxC container comprises processed user plane data, and each control word comprises control, synchronization, and/or management plane data.

The CPRI AxC containers and the control words are configured to be sent to a radio coupled to an antenna(s) identified by an antenna identifier in each container. In one embodiment, mapping (or transformation) data is provided by vendor(s) of the radio(s) 110. The mapping data identifies, for each CPRI AxC container data corresponding to an antenna from which data originated, a structure of data in the CPRI AxC container data. Such data includes user, control, synchronization, and management plane data, and antenna identifier. The vendor specific demapper 108f is further configured to transmit each CPRI AxC container to a unique radio coupled to the antenna identified by the corresponding antenna identifier. The transformation software, for example, may be a look up table or a database. Thus, the vendor specific demapper 108f presents data in a CPRI format to the radio(s) 110 where the data originated in a non-CPRI format, e.g., originated in eCPRI format.

The VSI system 104, in the uplink path 103b, comprises an uplink vendor specific interpreter (UL VSI) 104b, and an eCPRI open source encoder 104c. Optionally, the UL VSI 104b comprises a UL control plane vendor specific interpreter (cVSI) 108b-1, an UL synchronization plane vendor specific interpreter (sVSI) 108b-2, and/or an UL management plane vendor specific interpreter (mVSI) 108b-3.

Optionally, the VSI system 104 includes an open source demapper when the VSI system 104 is coupled to the modified fronthaul gateway 108, and needs to extract data from data format used by the network as exemplified below. The first RoE open source demapper 104a is configured to receive RoE type Ethernet data from the Ethernet network 106, extract processed user plane data, and control, synchronization, and management plane data from the data payloads of received Ethernet frames, and transmit the extracted processed user plane data, and control, synchronization, and management plane data to the UL VSI 104b. The extracted processed user plane data, and control, synchronization, and management plane data are in a vendor specific format.

Optionally, the vendor specific mapper 108a comprises software and/or hardware configured to detect the manufacturer(s) of the radio from which the CPRI AxC container and a corresponding control word originates to determine what software and/or hardware should be used to transform the vendor specific container data and corresponding control word into user, control, synchronization, and/or management plane data. The transformation software, for example, may be a look up table or a database.

For example, a radio uses management message protocols, e.g., simple object access protocol (SOAP), that differ from the management message protocols of O-RAN management plane, e.g., Netconf/Yang models or JavaScript object notation (JSON). The UL VSI 104b (e.g., the mVSI 104b-3) is configured to receive messages, e.g., management messages from the radio(s) 110, which were transported in CPRI format, convert such messages from the radio(s)' management plane format, e.g., in SOAP format, to an corresponding, or equivalent, O-RAN format (e.g., Netconf/Yang model format), and to transmit the messages in the O-RAN format to the eCPRI open source encoder 104c. As another example, user plane data sent from the first open source demapper 104a that corresponds to a CPRI AxC container, or Antenna-Carrier container, will be mapped by UL VSI 104b to a corresponding O-RAN defined eAxC, or extended Antenna-Carrier, and sent to the eCPRI open source encoder 104c. Optionally, control, synchronization, management and user messages may be converted respectively by the UL cVSI 104b-1, the UL sVSI 104b-2, the UL mVSI 104b-3, and the UL uVSI 104b-4. Optionally, no interpreter is required for user plane data.

Optionally, the O-DU 102 and the VSI system 104 are coupled by another Ethernet network comprising at least one Ethernet cable, at least one router, at least one Wi-Fi access point, and/or at least one switch.

The VSI system 104, in the downlink path 103a, comprises an eCPRI open source decoder 104d and a downlink vendor specific interpreter (DL VSI) 104e. Optionally, the DL VSI 104e comprises a DL control plane vendor specific interpreter (cVSI' or DL cVSI) 108e-1, a DL synchronization plane vendor specific interpreter (sVSI' or DL sVSI) 108e-2, a DL management plane vendor specific interpreter (mVSI' or DL mVSI) 108e-3, and/or a DL user plane vendor specific interpreter (uVSI' or DL uVSI) 104e-4.

Optionally, the VSI system 104 includes an open source mapper when the VSI system 104 is coupled to the modified fronthaul gateway 108, and needs to generate RoE type Ethernet data, e.g., in frames, used by the network as exemplified below. The first RoE open source mapper 104f is configured to generate RoE type Ethernet data using user, control, synchronization, and management plane data from DL VSI 104e, and to transmit the RoE Ethernet data to the Ethernet network 106.

The DL VSI 104e (e.g., the DL mVSI 104e-3) is configured to receive messages, e.g., management messages, in O-RAN M-plane format (e.g., Netconf/Yang model) convert such messages from an O-RAN format to a RRH ICD defined format (e.g., SOAP format), and to transmit the messages in the RRH ICD defined format to the first RoE open source mapper 104f. Optionally, user, control, synchronization, and management messages may be converted respectively by the DL uVSI 104e-4, DL cVSI 104e-1, the DL sVSI 104e-2, and the DL mVSI 104e-3. Optionally, no interpreter is required for user plane data.

The first RoE open source mapper 104f is configured to receive interpreted data (e.g., interpreted control, synchronization, and management plane data, and user data) from the DL VSI 104e, and to transform the interpreted data into frames of Ethernet data with a RoE Ethernet type as described elsewhere herein. The first RoE open source mapper 104f is further configured to transmit the frames of the Ethernet data with a RoE Ethernet type to the Ethernet network 106. The second RoE open source demapper 108d is configured to receive the Ethernet frames of a RoE type from the Ethernet network 106, and to extract user, control, synchronization, and management plane data from the received Ethernet frames. The second RoE open source demapper 108d is further configured to transmit user plane data to, e.g., the DL Low PHY 108e, and control, synchronization, and management plane data to the vendor specific demapper 108f.

Optionally, the vendor specific mapper 108a and the vendor specific demapper 108f are provided by the corresponding radio vendor. Optionally, a vendor specific mapper 108a and a vendor specific demapper 108f are implemented in the modified fronthaul gateway 108 that corresponds with type of radio(s) coupled to the modified fronthaul gateway 108. If there are two different types of radios comprising radio(s) 110, then the vendor specific mapper 108a and the vendor specific demapper 108f comprises different vendor specific mappers and vendor specific demappers for each type of radio.

Figure 2:
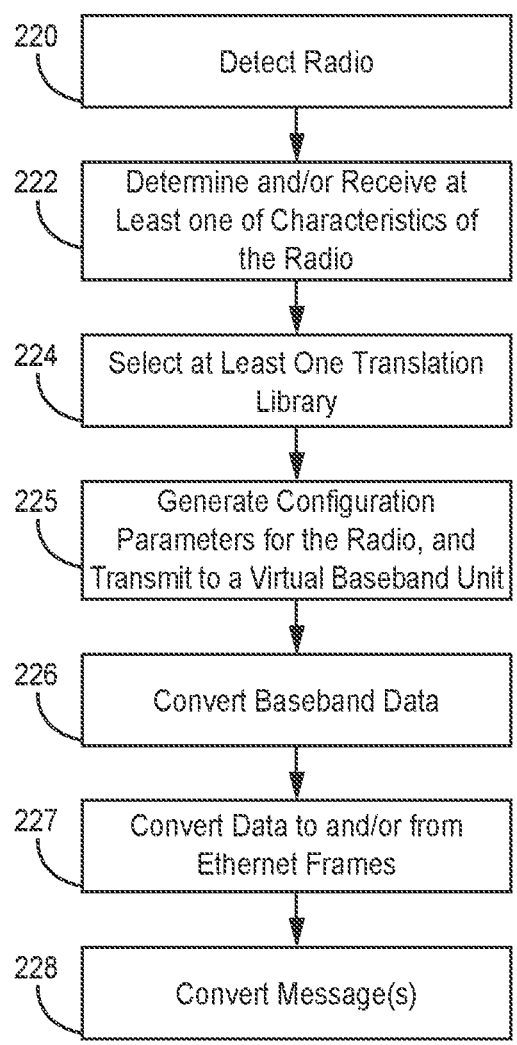
FIG. 2 is a flow diagram illustrating one embodiment of a method for converting data communicated between a virtual baseband unit and a radio which have incompatible message protocols.

FIG. 2 is a flow diagram illustrating one embodiment of a method 200 for converting data communicated between a virtual baseband unit and a radio having incompatible message protocols. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Optionally, the method 200 is performed by the VSI system 104, however, the method 200 may be implemented by other apparatus.

Optionally, in block 220, detect whether a radio is communicatively coupled to the virtual baseband unit, e.g., using techniques illustrated herein. In block 222, determine or receive characteristics of the radio. Such characteristics may be determined or provided as exemplified herein.

In block 224, select at least one translation library corresponding to determined and/or received characteristics of the radio. In block 225, generate configuration parameters (e.g., in a Netconf/Yang model or other format) that describe the capabilities of the radio, and transmit such configuration parameters to the virtual baseband unit. The at least one translation library may discover the radio vendor or manufacture identification. To that end, the at least one translation library may send a message typically sent at the initial operation of the radio in order to begin the process of exchanging messages, such as requesting configuration information or modifying configuration parameters that may alter the behavior of the radio. Such configuration information and parameters each include maximum transmission power of the radio. The at least one translation library may proceed by a trial and error approach to find the correct vendor library to use, for example based on a predefined list of vendors, the at least one translation library will ping (i.e., send a signal to provoke a response from) the radio, or send a request and listen for corresponding response from the radio, using each one of the predefined vendor's initial message formats until it receives a valid response. The ping or the request may start randomly from the predefined list of vendor's initial messages, or it may proceed according to a predefined order, e.g. based on a user defined vendor. Once the at least one translation library receives a valid response, it may use that response to identify the specific vendor for the radio, and select a portion of the at least one library to use for translating messages to and from the radio. The portion of the at least one library may be a sub-library of the at least one library.

To illustrate solely for pedagogical purpose how the at least one translation library may implement a translation procedure from NETCONF/Yang protocol to the identified vendor's radio unit management protocol, Table 1 is provided below. The radio comprises a NETCONF server, and the virtual baseband unit, e.g., the O-DU, comprises a NETCONF client. In NETCONF/Yang protocol, the NETCONF client sends requests to the NETCONF server in order to retrieve information from the NETCONF server or modify configuration of the radio. Table 1 below shows an example of how the at least one translation library maps NETCONF client initiated requests for information retrieval or modification to vendor specific messages that correspondingly retrieves information from or modifies the radio.

TABLE 1

| NETCONF Client Request | At Least One Translation Library Request to Radio |
|---|---|
| <get_config> | Vendor Specific Retrieve Radio Unit Information/Parameters Message |

TABLE 1-continued

| NETCONF Client Request | At Least One Translation Library Request to Radio |
|---|---|
| <edit_config> | Vendor Specific Modify Radio Unit Information/Parameters Message |

To illustrate an example of how the translation library may implement a translation of the responses sent from the radio unit to a NETCONF/Yang server response message, or response message and information, table 2 is provided below.

TABLE 2

| Radio Response Message | At Least One Translation Library Corresponding Response to NETCONF Client Request |
|---|---|
| Vendor Specific Acknowledge Message | <rpc_reply> |
| Vendor Specific Acknowledge for requested information/parameters | <rpc_reply><data> |

As shown in Table 1, in NETCONF/Yang protocol, the NETCONF client requests information from the NETCONF server by sending a message with the NETCONF tag <get_config>, which may be sent by the NETCONF client in the virtual baseband unit, e.g., the O-DU, and the request may be translated by the at least one translation library into a vendor specific message to retrieve configuration parameters that are requested in the <get_config> request. Similarly, a NETCONF/Yang client may send a request to modify certain configuration data by sending a request with the NETCONF tag <edit_config>, which can be translated by the at least one translation library by sending the identified radio vendor's message to modify the radio parameters specified in the <edit_config> NETCONF client request message.

Optionally, this block can be performed by the radio characterization system 104g and/or the VSI system 104. Optionally, one or more configuration parameters may be obtained from the radio by sending message(s) from the VSI system 104, e.g., the DL VSI 104e, to the radio to obtain a responsive message(s) with the configuration parameters at the UL VSI 104b. Optionally (additionally or alternatively), if the VSI system 104, e.g., the radio characterization system 104g, has determined radio characteristics, the VSI system 104, e.g., the radio characterization system 104g, can obtain at least one configuration parameter from a data source other than the radio, e.g., from a data repository such as a database, stored in the VSI system 104 or located remotely from the VSI system 104 in a processing system communicatively coupled to the VSI system 104.

In block 226, convert at least one of: (a) messages, in the uplink path, in the user plane, the control plane, the synchronization plane, and/or the management plane into a message protocol used by the virtual baseband unit, and (b) data, in the downlink path, in the message protocol used by the virtual baseband unit into data in the user plane, the control plane, the synchronization plane, and/or the management plane. In block 227, convert using the selected at least one translation library at least one of: a message protocol of a message transmitted from the radio to the virtual baseband unit to a message protocol of the baseband, and a message protocol of a message transmitted from the virtual baseband unit to the radio to a message protocol of the radio. Optionally, such conversion is of the message protocol of a message in the user plane, the control plane, the synchronization plane, and/or the management plane.

Optionally, in block 228, convert at least one of: the Ethernet frame(s) in the uplink path to data in at least one of the user plane, the control plane, the synchronization plane, and the management plane, and data in the user plane, the control plane, the synchronization plane, and the management plane to Ethernet frame(s) in the downlink path. Optionally, the Ethernet frame(s) in the uplink path are received from an Ethernet network, and the Ethernet frame(s) in the downlink path are transmitted by the Ethernet network.

Figure 3:
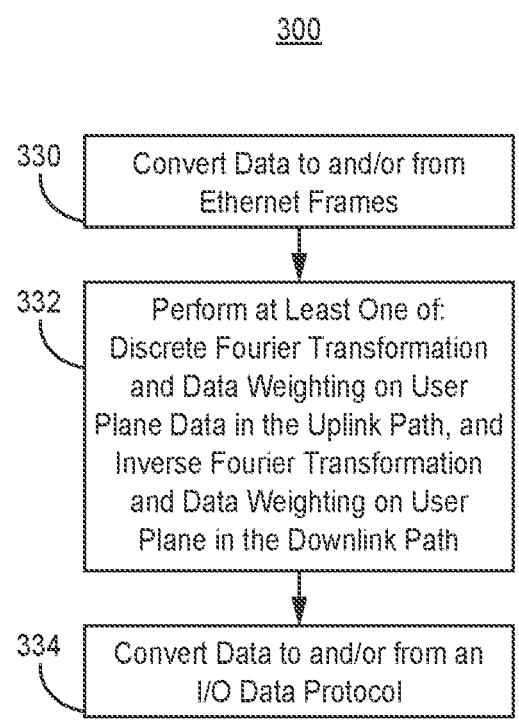
FIG. 3 is a flow diagram illustrating one embodiment of a method for communicatively coupling at least one radio to a system configured to execute the method illustrated in FIG. 2.

FIG. 3 is a flow diagram illustrating one embodiment of a method 300 for communicatively coupling at least one radio to a system configured to execute the method 200 illustrated in FIG. 2. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Optionally, the method 300 is performed by the modified fronthaul gateway, however, the method 300 may be implemented by other apparatus. Optionally, method 300 is performed in conjunction with method 200.

Optionally, in block 330, convert at least one of: Ethernet frames in the downlink path to data in the user plane, the control plane, the synchronization plane, and the management plane, and data in the user plane, the control plane, the synchronization plane, and the management plane in the uplink path to Ethernet frames. In block 332, perform at least one of: discrete Fourier transformation and data weighting on user plane data in the uplink path, and inverse Fourier transformation and data weighting on user plane data in the downlink path. In block 334, at least one of: convert data in the user plane, control plane, synchronization plane, and/or management plane in the downlink path to data in an I/O data protocol used by a radio, and convert data in the I/O data protocol used by the radio in the uplink path into data in the user plane, the control plane, the synchronization plane, and/or the management plane.

The processor systems (or processor circuitry), cloud computing systems (or cloud computing circuitry), and servers (server circuitry) disclosed herein may comprise state machines, neural network, and/or other types of computing systems. Such systems may comprise processing circuitry coupled to memory circuitry. The processing circuitry may include one or more microprocessors, microcontrollers, digital signal processing (DSP) elements, application-specific integrated circuits (ASICs), and/or field programmable gate arrays (FPGAs). The processor system may include or function with software programs, firmware, or other computer readable instructions, e.g., stored in the memory circuitry, for carrying out various process tasks, calculations, and control functions, used in the methods described herein. These instructions are typically tangibly embodied on any storage media (or computer readable medium) used for storage of computer readable instructions or data structures.

The memory circuitry can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, Blu-Ray discs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXAMPLE EMBODIMENTS

Example 1 includes a method of facilitating communications between a radio and a virtual baseband unit, comprising: at least one of: determining characteristics of the radio and receiving characteristics of the radio using a first input/output (I/O) data protocol and a first message protocol; selecting at least one translation library corresponding to the at least one of determined characteristics and the received characteristics; generating configuration parameters that describe capabilities of the radio, and transmit such configuration parameters to the virtual baseband unit using a second I/O data protocol and a second message protocol, wherein the first I/O data protocol and the second I/O data protocol are incompatible; converting at least one of: (a) baseband data, in an uplink path, in at least one of a user plane, a control plane, a synchronization plane, and a management plane into the second I/O data protocol used by the virtual baseband unit, and (b) baseband data, in a downlink path, in the second I/O data protocol into data in at least one of the user plane, the control plane, the synchronization plane, and the management plane; and converting using the selected at least one translation library at least one of: a message in the first message protocol, transmitted from the radio to the virtual baseband unit, to the second message protocol, and a message in the second message protocol transmitted from the virtual baseband unit to the radio, to the first message protocol, wherein the first message protocol and the second message protocol are incompatible.

Example 2 includes the method of Example 1, wherein the configuration parameters are in a Netconf/Yang model format.

Example 3 includes the method of Examples 1-2, further comprising at least one of: sending at least one message to the radio to obtain a responsive message including at least one configuration parameter, and obtaining at least one configuration parameter from a data source other than the radio.

Example 4 includes the method of Examples 1-3, further comprising detecting whether the radio is communicatively coupled to the virtual baseband unit.

Example 5 includes the method of Examples 1-4, wherein the converted data comprises data in at least one of a user plane, a control plane, a synchronization plane, and a management plane.

Example 6 includes the method of Examples 1-5, further comprising converting at least one of: an Ethernet frame in an uplink path to data in at least one of a user plane, a control plane, a synchronization plane, and a management plane, and data in at least one of the user plane, the control plane, the synchronization plane, and the management plane to an Ethernet frame in a downlink path.

Example 7 includes the method of Examples 1-6, further comprising: performing at least one of: at least one of discrete Fourier transformation and data weighting on user plane data in the uplink path, and at least one of inverse Fourier transformation and data weighting on user plane data in the downlink path; and at least one of: converting data in at least one of a user plane, a control plane, a synchronization plane, and a management plane in a downlink path to data in an I/O data protocol used by the radio, and converting data in the I/O data protocol used by the radio in an uplink path into data in at least of the user plane, the control plane, the synchronization plane, and the management plane.

Example 8 includes a program product comprising a processor readable medium on which program instructions are embodied, wherein the program instructions are configured, when executed by at least one programmable processor, to cause the at least one programmable processor to: at least one of: determine characteristics of a radio and receive characteristics of the radio using a first input/output (I/O) data protocol and a first message protocol; select at least one translation library corresponding to the at least one of determined characteristics and the received characteristics; generate configuration parameters that describe capabilities of the radio, and transmit such configuration parameters to a virtual baseband unit using a second I/O data protocol and a second message protocol, wherein the first I/O data protocol and the second I/O data protocol are incompatible; convert at least one of: (a) baseband data, in an uplink path, in at least one of a user plane, a control plane, a synchronization plane, and a management plane into the second input/output data protocol used by the virtual baseband unit, and (b) baseband data, in a downlink path, in the second I/O data protocol into data in at least one of the user plane, the control plane, the synchronization plane, and the management plane; and convert using the selected at least one translation library at least one of: a message in the first message protocol, transmitted from the radio to the virtual baseband unit, to the second message protocol, and a message in the second message protocol transmitted from the virtual baseband unit to the radio, to the first message protocol, wherein the first message protocol and the second message protocol are incompatible.

Example 9 includes the program product of Example 8, wherein the configuration parameters are in a Netconf/Yang model format.

Example 10 includes the program product of Examples 8-9, wherein the program instructions are configured, when executed by at least one programmable processor, to further cause the at least one programmable processor to at least one of: send at least one message to the radio to obtain a responsive message including at least one configuration parameter, and obtain at least one configuration parameter from a data source other than the radio.

Example 11 includes the program product of Examples 8-10, wherein the program instructions are configured, when executed by at least one programmable processor, to further cause the at least one programmable processor to detect whether the radio is communicatively coupled to the virtual baseband unit.

Example 12 includes the program product of Examples 8-11, wherein the converted data comprises data in at least one of a user plane, a control plane, a synchronization plane, and a management plane.

Example 13 includes the program product of Examples 8-12, wherein the program instructions are configured, when executed by at least one programmable processor, to further cause the at least one programmable processor to convert at least one of: an Ethernet frame in an uplink path to data in at least one of a user plane, a control plane, a synchronization plane, and a management plane, and data in at least one of the user plane, the control plane, the synchronization plane, and the management plane to an Ethernet frame in a downlink path.

Example 14 includes a system configured to couple a radio to a virtual baseband unit, comprising: first circuitry configured to: at least one of: perform at least one of discrete Fourier transformation and data weighting on user plane data in an uplink path, and perform at least one of inverse Fourier transformation and data weighting on user plane data in an downlink path; and at least one of: convert data in at least one of a user plane, a control plane, a synchronization plane, and a management plane in a downlink path to data in a first input/output (I/O) data protocol, and convert data in the first I/O data protocol in an uplink path into data in at least one of the user plane, the control plane, the synchronization plane, and the management plane; and second circuitry, communicatively coupled to the first circuitry, configured to at least one of: at least one of: determine characteristics of the radio and receive characteristics of the radio using the first I/O data protocol and a first message protocol; select at least one translation library corresponding to the at least one of determined characteristics and the received characteristics; generate configuration parameters that describe capabilities of the radio, and transmit such configuration parameters to the virtual baseband unit using a second I/O data protocol and a second message protocol, wherein the first I/O data protocol and the second I/O data protocol are incompatible; convert at least one of: (a) baseband data, in an uplink path, in at least one of a user plane, a control plane, a synchronization plane, and a management plane into the second I/O data protocol used by the virtual baseband unit, and (b) baseband data, in a downlink path, in the second I/O data protocol into data in at least one of the user plane, the control plane, the synchronization plane, and the management plane; and convert using the selected at least one translation library at least one of: a message in the first message protocol, transmitted from the radio to the virtual baseband unit, to the second message protocol, and a message in the second message protocol transmitted from the virtual baseband unit to the radio, to the first message protocol, wherein the first message protocol and the second message protocol are incompatible.

Example 15 includes the system of Example 14, further comprising: the radio communicatively coupled to the first circuitry; and the virtual baseband unit communicatively coupled to the second circuitry.

Example 16 includes the system of Examples 14-15, wherein the configuration parameters are in a Netconf/Yang model format.

Example 17 includes the system of Examples 14-16, wherein the second circuitry is further configured to send at least one message to the radio to obtain a responsive message including at least one configuration parameter, and obtain at least one configuration parameter from a data source other than the radio.

Example 18 includes the system of Examples 14-17, wherein the second circuitry is further configured to detect whether the radio is communicatively coupled to the virtual baseband unit.

Example 19 includes the system of Examples 14-18, wherein the converted data comprises data in at least one of a user plane, a control plane, a synchronization plane, and a management plane.

Example 20 includes the system of Examples 14-19, wherein the first circuitry is further configured to convert at least one of: an Ethernet frame in an downlink path to data in at least one of a user plane, a control plane, a synchronization plane, and a management plane, and data in at least one of the user plane, the control plane, the synchronization plane, and the management plane to an Ethernet frame in a uplink path; and wherein the second circuitry is further configured to convert at least one of: an Ethernet frame in an uplink path to data in at least one of a user plane, a control plane, a synchronization plane, and a management plane, and data in at least one of the user plane, the control plane, the synchronization plane, and the management plane to an Ethernet frame in a downlink path.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An apparatus for facilitating communications between a radio and a baseband unit, the apparatus comprising:
   a first fronthaul interface circuit configured to communicatively couple the apparatus to the baseband unit;
   a second fronthaul interface circuit configured to communicatively couple the apparatus to the radio; and
   circuitry configured to:
      receive first downlink transport data through the first fronthaul interface circuit and from the baseband unit, the first downlink transport data formatted in accordance with a first transport format;
      produce second downlink transport data using downlink user data derived from the first downlink transport data by using the downlink user data to automatically produce downlink messages communicated using the second downlink transport data, the second downlink transport data formatted in accordance with a second transport format;
      transmit the second downlink transport data to the radio;
      receive second uplink transport data from the radio, the second uplink transport data formatted in accordance with the second transport format;
      produce first uplink transport data using uplink user data derived from the second uplink transport data to automatically produce uplink messages communicated using the first uplink transport data, the first uplink transport data formatted in accordance with the first transport format; and
      transmit the first uplink transport data to the baseband unit; and
   wherein the downlink user data is used for communicating downlink voice data and/or other downlink data wirelessly transmitted to user equipment via the radio and the uplink user data is used for communicating uplink voice data and/or other uplink data wirelessly received from the user equipment via the radio.

2. The apparatus of claim 1, wherein the circuitry is further configured to:
   determine or receive characteristics of the radio;
   using the characteristics of the radio, to select at least one translation library;
   automatically produce the downlink messages, using the at least one translation library, to convert first downlink messages in a first protocol to the downlink messages in a second protocol; and
   automatically produce the uplink messages, using the at least one translation library, to convert second uplink messages in the second protocol to the uplink messages in the first protocol.

3. The apparatus of claim 1, wherein the baseband unit is a virtual baseband unit.

4. The apparatus of claim 1, wherein the first transport format is an Ethernet based format;
   wherein the second transport format is a common public radio interface (CPRI).

5. The apparatus of claim 4 wherein the Ethernet based format is an enhanced CPRI (eCPRI).

6. The apparatus of claim 1, wherein the baseband unit is a virtual baseband unit;
   wherein the first fronthaul interface circuit is further configured to communicatively couple the apparatus to the baseband unit through an Ethernet network;
   wherein the second fronthaul interface circuit is further configured to communicatively couple the apparatus to the radio through a common public radio interface (CPRI) communication link.

7. The apparatus of claim 6, wherein the first fronthaul interface circuit is further configured to communicatively couple the apparatus to the baseband unit through the Ethernet network using an enhanced CPRI (eCPRI) communication link.

8. The apparatus of claim 1, wherein the circuitry is further configured to produce the second downlink transport data by using the downlink user data to perform at least some downlink physical layer processing for a wireless interface.

9. The apparatus of claim 8, wherein said at least some downlink physical layer processing for the wireless interface comprises performing at least one of an inverse Fourier transformation and data weighting.

10. The apparatus of claim 1, wherein the circuitry is further configured to produce the first uplink transport data by using the uplink user data to perform at least some uplink physical layer processing for a wireless interface.

11. The apparatus of claim 10, wherein said at least some uplink physical layer processing for the wireless interface comprises performing at least one of a Fourier transformation and data weighting.

12. A method for facilitating communications between a radio and a baseband unit, the method comprising:
   receiving first downlink transport data from the baseband unit, the first downlink transport data formatted in accordance with a first transport format;
   producing second downlink transport data using downlink user data derived from the first downlink transport data by using the downlink user data to automatically produce downlink messages communicated using the second downlink transport data, the second downlink transport data formatted in accordance with a second transport format;
   transmitting the second downlink transport data to the radio;
   receiving second uplink transport data from the radio, the second uplink transport data formatted in accordance with the second transport format;
   produce first uplink transport data using uplink user data derived from the second uplink transport data to automatically produce uplink messages communicated using the first uplink transport data, the first uplink transport data formatted in accordance with the first transport format; and
   transmit the first uplink transport data to the baseband unit; and
   wherein the downlink user data is used for communicating downlink voice data and/or other downlink data transmitted to user equipment via the radio and the uplink user data is used for communicating uplink voice data and/or other uplink data received from the user equipment via the radio.

13. The method of claim 12, further comprising:
   determining or receiving characteristics of the radio;
   using the characteristics of the radio, to select at least one translation library;
   automatically producing the downlink messages, using the at least one translation library, to convert first downlink messages in a first protocol to the downlink messages in a second protocol; and
   automatically producing the uplink messages, using the at least one translation library, to convert second uplink messages in the second protocol to the uplink messages in the first protocol.

14. The method of claim 12, wherein the baseband unit is a virtual baseband unit.

15. The method of claim 12, wherein the first transport format is an Ethernet based format;
   wherein the second transport format is a common public radio interface (CPRI).

16. The method of claim 15 wherein the Ethernet based format is an enhanced CPRI (eCPRI).

17. The method of claim 12, further comprising producing the second downlink transport data by using the downlink user data to perform at least some downlink physical layer processing for a wireless interface.

18. The method of claim 17, wherein performing said at least some downlink physical layer processing for the wireless interface comprises performing at least one of an inverse Fourier transformation and data weighting.

19. The method of claim 12, further comprising producing the first uplink transport data by using the uplink user data to perform at least some uplink physical layer processing for a wireless interface.

20. The method of claim 19, wherein performing said at least some uplink physical layer processing for the wireless interface comprises performing at least one of a Fourier transformation and data weighting.

* * * * *